United States Patent
Toth et al.

(10) Patent No.: US 9,306,467 B2
(45) Date of Patent: Apr. 5, 2016

(54) MICRO-INVERTER WITH IMPROVED CONTROL

(71) Applicant: Belenos Clean Power Holding AG, Bienne (CH)

(72) Inventors: Antoine Toth, Delemont (CH); Yvan Leuppi, Rovray (CH)

(73) Assignee: Belenos Clean Power Holding AG, Bienne (CH)

( * ) Notice: Subject to any disclaimer, the term of this patent is extended or adjusted under 35 U.S.C. 154(b) by 84 days.

(21) Appl. No.: 14/043,337

(22) Filed: Oct. 1, 2013

(65) Prior Publication Data

US 2014/0092651 A1   Apr. 3, 2014

(30) Foreign Application Priority Data

Oct. 3, 2012   (EP) .................................... 12187121

(51) Int. Cl.
| | | |
|---|---|---|
| H02M 5/42 | (2006.01) | |
| H02M 7/48 | (2007.01) | |
| H02M 1/12 | (2006.01) | |
| H02J 3/38 | (2006.01) | |
| H02M 1/00 | (2007.01) | |

(52) U.S. Cl.
CPC .............. *H02M 5/42* (2013.01); *H02M 7/4807* (2013.01); *H02J 3/381* (2013.01); *H02M 1/12* (2013.01); *H02M 2001/007* (2013.01); *H02M 2001/0054* (2013.01); *Y02B 70/1491* (2013.01)

(58) Field of Classification Search
CPC ........ H02M 3/335; H02M 1/00; H05M 41/28
USPC ......... 315/128, 219, 247, 224, 309, 307, 291; 363/16, 17, 21.13, 41, 98, 131
See application file for complete search history.

(56) References Cited

U.S. PATENT DOCUMENTS

| | | | | |
|---|---|---|---|---|
| 6,046,551 | A * | 4/2000 | Kita .............................. | 315/307 |
| 6,339,262 | B1 * | 1/2002 | Igarashi .................. | H02M 1/34 307/31 |
| 6,504,267 | B1 * | 1/2003 | Giannopoulos ... | H02M 3/33561 307/31 |

(Continued)

FOREIGN PATENT DOCUMENTS

| | | |
|---|---|---|
| EP | 1 531 542 A2 | 5/2005 |
| EP | 2 466 741 A1 | 6/2012 |
| JP | 2007-174866 | 7/2007 |
| WO | WO 2012/080482 A1 | 6/2012 |

OTHER PUBLICATIONS

European Search Report issued Feb. 14, 2013, in European Application No. 12 18 7121.4 filed Oct. 3, 2012 (with English Translation).

*Primary Examiner* — Rajnikant Patel
(74) *Attorney, Agent, or Firm* — Oblon, McClelland, Maier & Neustadt, L.L.P.

(57) ABSTRACT

The invention concerns an electrical module for adapting a first signal of a first system to a second signal of a second system, including:
  an input arranged so that a power source can be connected thereto, said power source delivering a first signal, said first signal being a direct signal,
  a converter module arranged to convert the supply voltage into an intermediate rectified signal formed of a direct component and a sinusoidal component;
  an inverter module arranged to output a signal compatible with a second signal of a second system.

7 Claims, 3 Drawing Sheets

(56) References Cited

U.S. PATENT DOCUMENTS

| | | | |
|---|---|---|---|
| 6,549,432 B1 * | 4/2003 | Giannopoulos | H02M 3/33561 363/21.14 |
| RE41,908 E * | 11/2010 | Hall | H02M 3/33507 361/90 |
| 8,111,012 B2 * | 2/2012 | Sanchez | 315/307 |
| 2003/0012038 A1 | 1/2003 | Welches et al. | |
| 2005/0105224 A1 * | 5/2005 | Nishi | H02M 3/285 361/18 |
| 2011/0058396 A1 | 3/2011 | Oppermann | |
| 2011/0103117 A1 | 5/2011 | Yoneda | |

* cited by examiner

MICRO-INVERTER WITH IMPROVED CONTROL

This application claims priority from European patent application No. 12187121.4 filed Oct. 3, 2012, the entire disclosure of which is incorporated by reference.

The invention concerns an electrical module for adapting a first signal of a first system to a second signal of a second system including:
- an input arranged so that a power source can be connected thereto, said power source delivering a first signal, said first signal being a direct signal,
- a converter module arranged to convert the supply voltage into an intermediate signal formed of a direct component and a rectified sinusoidal component;
- an inverter module arranged to output a signal compatible with a second signal of a second system.

BACKGROUND OF THE INVENTION

There are known electrical systems whose purpose is to render a signal compatible with an electrical power grid. One example of these electrical systems includes an electrical power supply delivering a direct signal, the output of said supply is connected to a converter module delivering a direct signal. This signal is sent to an inverter module which will convert the signal into a power grid compatible signal, in this case a sinusoidal signal.

In current systems, the value of this direct signal is defined to enable it to deliver the voltage value of the output signal. For example, for a power grid operating at an RMS voltage of 230 VAC, the maximum voltage will be 325 volts, i.e. the RMS voltage multiplied by $\sqrt{2}$.

One drawback of this system is that it causes significant switching losses. Indeed, the conversion of the outgoing converter module signal by the inverter module occurs at time intervals. This means that the sinusoidal output signal is constructed gradually in little parts, each little part being a portion of the final signal. Each little part of the final sinusoidal signal represents a surface A1, the sum of these surfaces A1 forming the sinusoidal signal which goes over the power grid. Consequently, the inverter module will switch when the direct signal is converted into a sinusoidal signal. The switch lasts for a set period of time, which is defined such that the surface R1 of the direct component is identical to surface A1 as seen in FIG. 3. Consequently, when surface A1 is very small, the switching time of the inverter module must be very short. Therefore, switching of a high voltage causes significant switching losses to appear.

SUMMARY OF THE INVENTION

It is an object of the invention to overcome the drawbacks of the prior art by proposing to provide an electronic system that adapts a first signal to a second signal causing the fewest possible losses.

The invention therefore concerns an electrical module for adapting a first signal of a first system to a second signal of a second system including:
- an input arranged so that a power source can be connected thereto, said power source delivering a first signal, said first signal being a direct signal,
- a converter module arranged to convert the supply voltage into an intermediate signal formed of a direct component and a rectified sinusoidal component;
- an inverter module arranged to output a signal compatible with a second signal of a second system, characterized in that said inverter module is arranged to use the intermediate signal and convert it into a sinusoidal signal compatible with a second signal of said second system.

In a first advantageous embodiment, said inverter module includes an H bridge.

In a second advantageous embodiment, it further includes a microcontroller for controlling said converter module.

In another advantageous embodiment, the converter module includes at least one regulator unit comprising a transformer which is connected in series with a switching means, said switching means being controlled by said microcontroller.

In another advantageous embodiment, said converter module includes at least two regulator units which are connected in parallel via their outputs, in parallel or in series or in a combination of series and parallel connections via their inputs, wherein the inputs of the units are floating and the regulator units are controlled by pulse-width modulation.

The invention also concerns an operating method of an electrical module for adapting a first signal of a first system to a second signal of a second system, said module comprising:
- an input arranged so that a power source can be connected thereto, said power source delivering a first signal, said first signal being a direct signal,
- a converter module arranged to convert the supply voltage into an intermediate signal formed of a direct component and a rectified sinusoidal component;
- an inverter module arranged to output a signal compatible with a second signal of a second system, characterized in that the method includes the following steps:
- delivering the first signal to the input of said electrical module;
- converting, via the converter module, the first signal into an intermediate signal comprising a direct component and a rectified sinusoidal component;
- converting the intermediate signal into a signal compatible with the second signal of the second system.

In another advantageous embodiment, the sinusoidal component of the intermediate signal and the second signal have the same frequency.

BRIEF DESCRIPTION OF THE DRAWINGS

The objects, advantages and features of the electronic module and the method according to the present invention will appear more clearly in the following detailed description of at least one embodiment of the invention, given solely by way of non-limiting example and illustrated by the annexed drawings, in which:

FIGS. 3 to 5 show schematic voltage diagrams of the electronic module according to the invention.

DETAILED DESCRIPTION OF THE INVENTION

Figure 1:
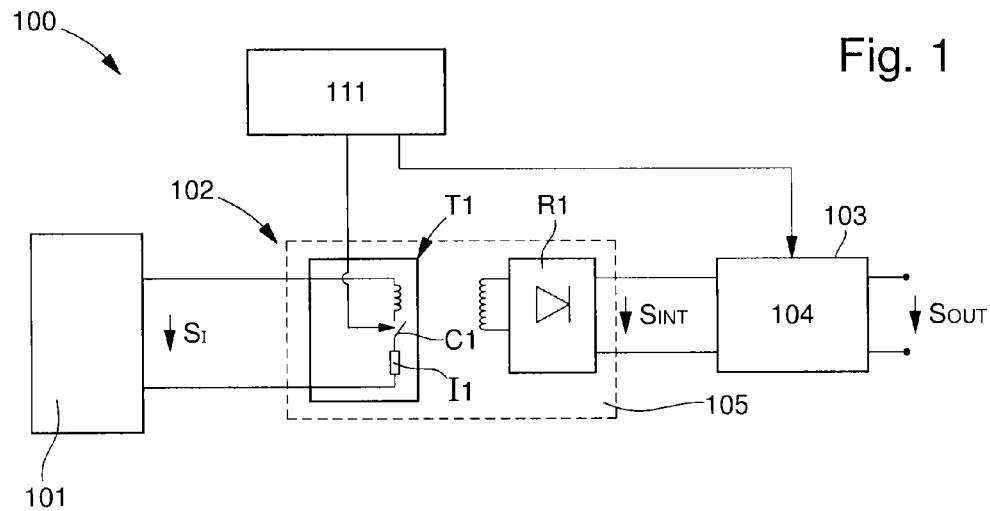
FIG. 1 is a schematic view of the electronic module according to the invention.

FIG. 1 shows an electronic system 100 according to the invention. The electronic system is an electrical module 100 for adapting a first signal $S_I$ of a first system to a second signal $S_{out}$ of a second system. The first system may be an electrical power supply 101 delivering a direct voltage. For example, this electrical power supply 101 may be one or more solar panels or one or more wind turbines or one or more batteries or other elements. The second system is, for example, the domestic electrical power grid, i.e. a sinusoidal voltage.

Figure 2:
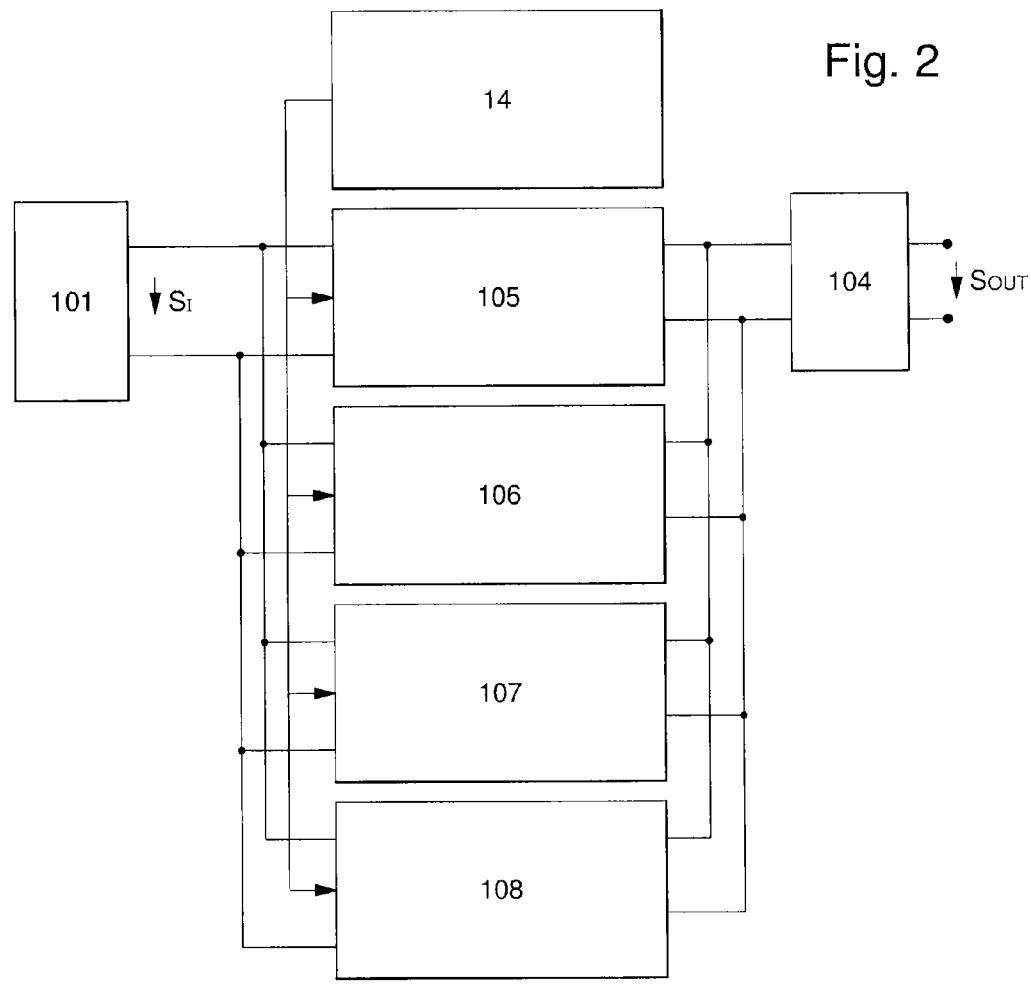
FIGS. 2 to 6 each show schematic views of a variant of the invention.
Figure 3:
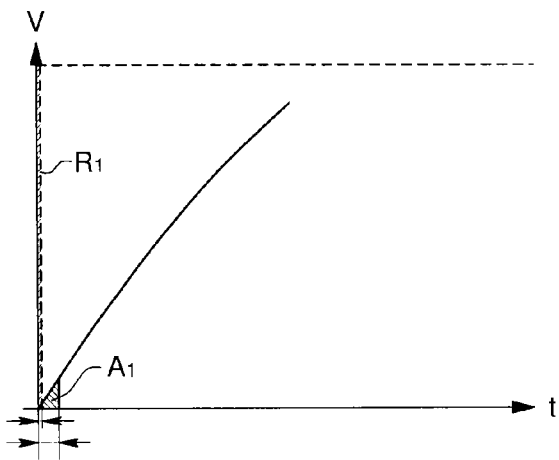

The direct output voltage of the power supply enters a converter module 102. The converter module includes at least one regulator unit 105. In a variant visible in FIG. 2, the converter module may be provided with several regulator units 106, 107 and 108 connected in parallel via their outputs, in parallel or in series or in a combination of parallel and series connections via their inputs, and the inputs of the units are floating.

The regulator unit includes a transformer T1 in series with switching means C1. Regulator unit 105 further includes a current measuring means I1 series connected to switching means C1. Transformer T1, switching means C1 and current measuring means I1 are connected in parallel with a first uncoupling means connected in parallel with power supply 101 and not shown. Regulator unit 105 also includes a rectifier R1 connected to the output of transformer T1 to deliver an intermediate signal. It is thus clear that regulator unit 105 includes its own rectifier. Converter module 102 further includes a microcontroller 111. Microcontroller 111 is used to control the regulator unit.

Figure 6:
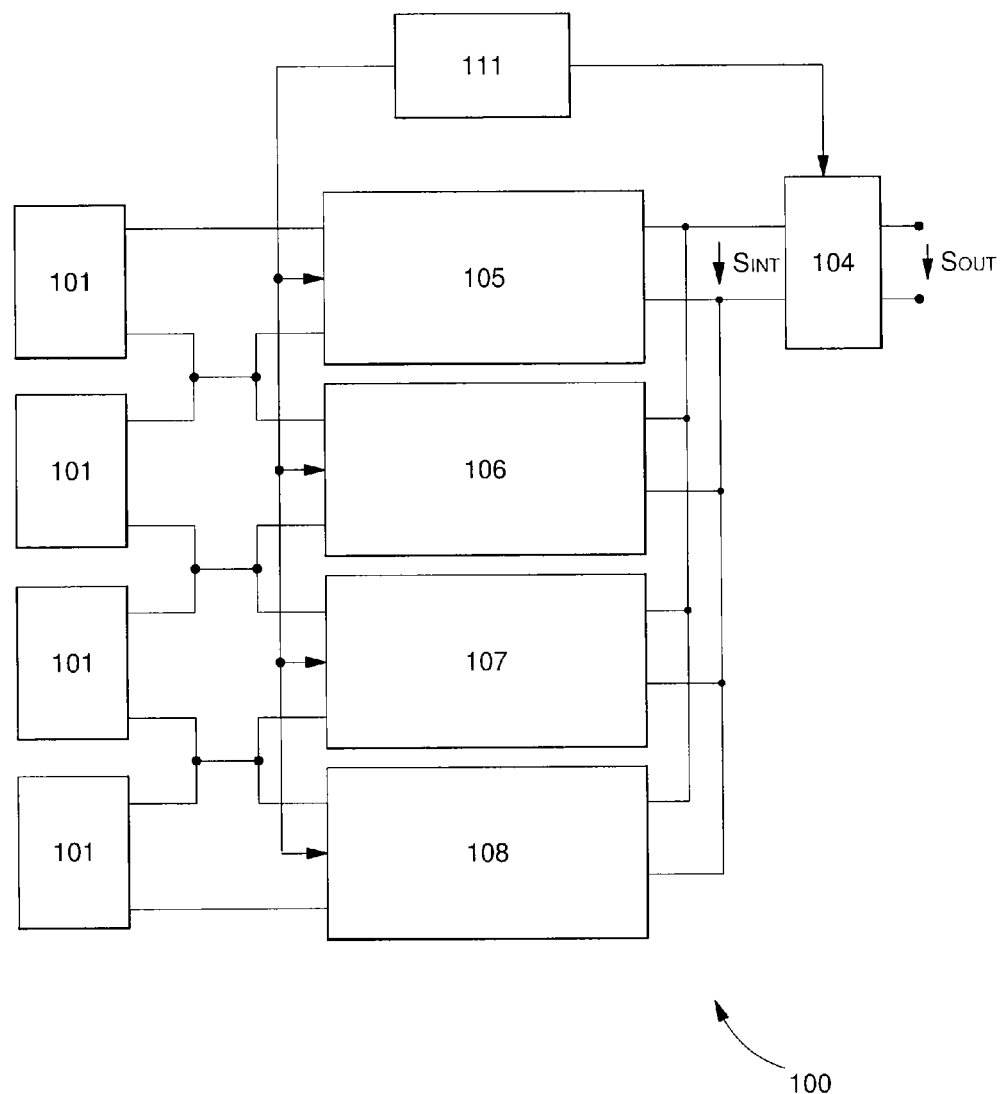

If the converter module has regulator units 105, 106, 107 and 108 connected in parallel or in series or in a combination of parallel and series connections, microcontroller 111 controls each regulator unit 105, 106, 107 and 108 using pulse-width modulation. In that case, microcontroller 111 uses a single control for all of the regulator units. If there are several electrical power supplies 101 in parallel or in series, the regulator unit control may be distinct for each regulator unit or one control for all of the regulator units as seen in FIG. 6.

In another variant of the present invention, it is possible to envisage the control of regulator units 105, 106, 107 and 108 being phase shifted. Indeed, control using signal phase shifting means that one regulator unit is activated in each time period. This means that each regulator unit is activated once every four periods.

This variant provides for the regulator units to be activated in the same period but phase shifted. This therefore means that during each period, all of the regulator units 105, 106, 107 and 108 are activated so that only one regulator unit 105, 106, 107 and 108 is active at any given moment.

In the present case, the phase shift is a quarter of a period namely T/4 so that at instant t=0, the first regulator unit 105 is activated, with a pulse width ranging from 0 to T/4. At t=T/4, the second regulator unit 106 is activated. At t=T/2, the third regulator unit 107 is activated and at t=3T/4, the fourth regulator unit 108 is activated.

This manner of controlling the regulator units enables the operating frequency to be virtually increased. Indeed, instead of one actuation of regulator units 105, 106, 107 and 108 per period, there are four actuations per period. More specifically, it is the uncoupling means which sees an increase in the actuation frequency of regulator units 105, 106, 107 and 108.

The impedance of the capacitors is frequency dependent. Consequently, if the frequency increases, it is possible to reduce the capacitor value while maintaining the same impedance. Further, since the size and cost of a capacitor are linked to its farad value, a decrease in said value results in a decrease in the size and price of the capacitors of the uncoupling means without decreasing the efficiency of the uncoupling means.

Intermediate signal Sint is sent to an inverter module 103. Inverter module 103 includes an H bridge circuit 104. This type of circuit takes the form of a plurality of switches arranged in an H shape. It is thus clear that said H bridge has two parallel branches each formed of two series-connected switches. H bridge 104 powers a charge which is located between the central branch connecting the two parallel branches; this central branch is connected to each branch at the point of connection between the two switches.

The bridge can be operated so that the polarity of the charge voltage is varied cyclically, making it into an inverter; microcontroller 111 being arranged to send control signals to the switches of H bridge 104. This H bridge 104 is used as an inverter to convert the intermediate signal Sint connected to its input into a power grid compatible signal.

Advantageously according to the invention, the intermediate signal Sint is a rectified sinusoidal signal and is used to form the power grid-compatible output signal. This intermediate signal includes a direct component $S_R$, i.e. a direct signal of predefined amplitude and a rectified sinusoidal component $S_Q$. This intermediate signal Sint takes the form of a half sine or rectified sine signal, i.e. the sinusoidal portions are all positive. In other words, this intermediate signal is formed of a direct component and a rectified sine.

Figure 4:
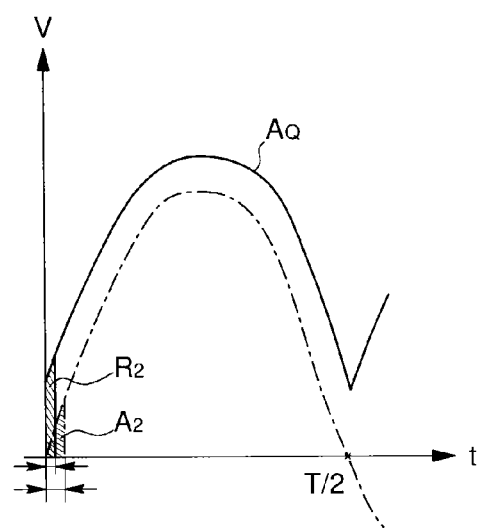

This configuration has the advantage of reducing switching losses. Indeed, as seen in FIG. 4, the shape of intermediate signal Sint is close to the shape of the electronic system output signal and differs from the electronic system output signal in its amplitude and rectified shape. Consequently, when intermediate signal Sint is converted into a power grid compatible signal, the switching time is increased. To achieve this, intermediate signal Sint will be generated by said converter module 102 so that it can have an identical frequency to the output frequency. For example, for the Swiss or French electrical power grid, the frequency is 50 Hz and the converter module therefore has to generate an intermediate signal whose sinusoidal component has a frequency of 50 Hz. However, due to the intrinsic shape of the intermediate signal, it will have a dual frequency relative to the power grid signal.

Indeed, it has previously been explained that, to create a partial element of the output signal having a duration t2, converter module 103 must, within time period t2, switch the incoming signal, i.e. intermediate signal Sint, for a moment which is calculated so that the surface R2 of the switched intermediate signal is equal to the surface A2 of the partial element of the output signal. Surface is generally a function of height and width. This means that if the height is decreased, the width must increase to obtain a constant surface, and vice versa.

In the case of the present invention, the configuration wherein the shape of intermediate signal Sint is close to the output signal means that there is a small amplitude deviation between the amplitude of intermediate signal Sint and the amplitude of output signal $S_{out}$. Conversely, if a direct signal with constant direct amplitude is used, the deviation from the output signal amplitude is variable and may be very high.

Figure 5:
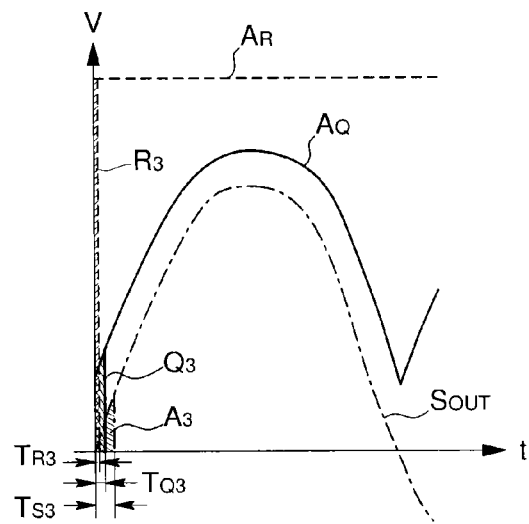

Hence, to obtain a surface A3 having a duration $T_{S3}$ for the output signal seen in FIG. 5, intermediate signal Sint must be switched for a time period $T_{Q3}$ in order to obtain a surface Q3 equivalent to surface A3, whereas to achieve the same objective in the prior art, a direct signal must be switched for a time period $T_{R3}$ to obtain a surface R3. It is observed therefore that the duration of time period $T_{Q3}$ is greater than the duration of time period $T_{R3}$.

Consequently, the fact of using intermediate signal Sint to form the output signal provides an inverter module 103 which switches lower voltage levels thereby considerably reducing switching losses. The operation of electronic system 100 is consequently optimised. Further, since lower voltage levels are switched, the current also has a lower ripple. The current which is delivered by H bridge 104 and injected into the power grid is thus of better quality.

It will be clear that various alterations and/or improvements and/or combinations evident to those skilled in the art may be made to the various embodiments of the invention set out above without departing from the scope of the invention defined by the annexed claims.

What is claimed is:

1. An electrical module for adapting a first signal ($S_I$) of a first system to a second signal ($S_{out}$) of a second system comprising:
    an input arranged so that a power source can be connected thereto, said power source delivering the first signal, said first signal being a direct signal;
    a converter module arranged to convert a supply voltage into an intermediate signal (Sint) formed of a direct component and a rectified sinusoidal component; and
    an inverter module arranged to output a signal compatible with the second signal of the second system, wherein said inverter module is configured to use the intermediate signal and to convert said intermediate signal into a sinusoidal signal compatible with the second signal of said second system.

2. The electronic module according to claim 1, wherein said inverter module includes an H bridge.

3. Electronic module according to claim 1, wherein the module further includes a microcontroller for controlling said converter module.

4. Electronic module according to claim 3, wherein the converter module includes at least one regulator unit comprising a transformer which is connected in series with a switching means, said switching means being controlled by said microcontroller.

5. Electronic module according to claim 4, wherein said converter module includes at least two regulator units connected in parallel via their outputs, in parallel or in series or in a combination of parallel and series connections via their outputs, wherein the inputs of the units are floating, the regulator units being controlled using pulse-width modulation.

6. Operating method of an electrical module for adapting a first signal ($S_I$) of a first system to a second signal ($S_{out}$) of a second system, said module including:
    an input arranged so that a power source can be connected thereto, said power source delivering a first signal, said first signal being a direct signal;
    a converter module arranged to convert a supply voltage into an intermediate rectified signal ($S_{int}$) formed of a direct component and a sinusoidal component;
    an inverter module arranged to output a signal compatible with the second signal of the second system, wherein the method comprises the following steps:
    delivering the first signal to the input of said electrical module;
    converting, via the converter module, the first signal into an intermediate signal comprising a direct component and a sinusoidal component; and
    converting the intermediate signal into a signal compatible with the second signal of the second system.

7. Operating method according to claim 6, wherein the sinusoidal component of the intermediate signal and the second signal have a same frequency.

* * * * *